Nov. 15, 1960 S. B. HANSSEN 2,960,329
WEIGHING SCALE
Filed Jan. 22, 1957 3 Sheets-Sheet 1
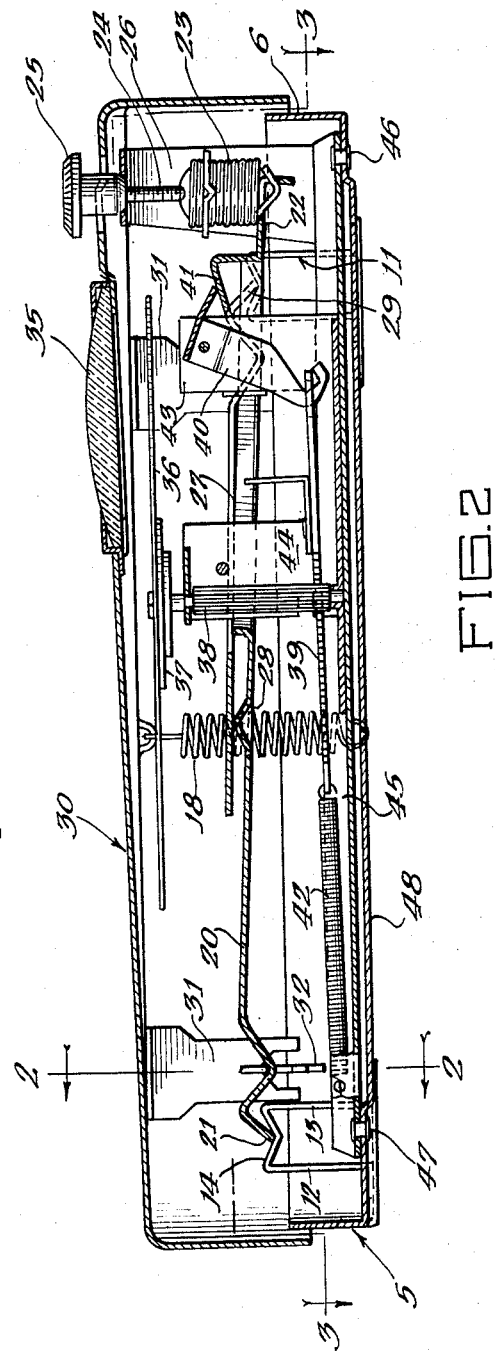
Inventor:
Stan B. Hanssen
By: Schroeder, Hofgren,
Brady & Wegner
Attorneys

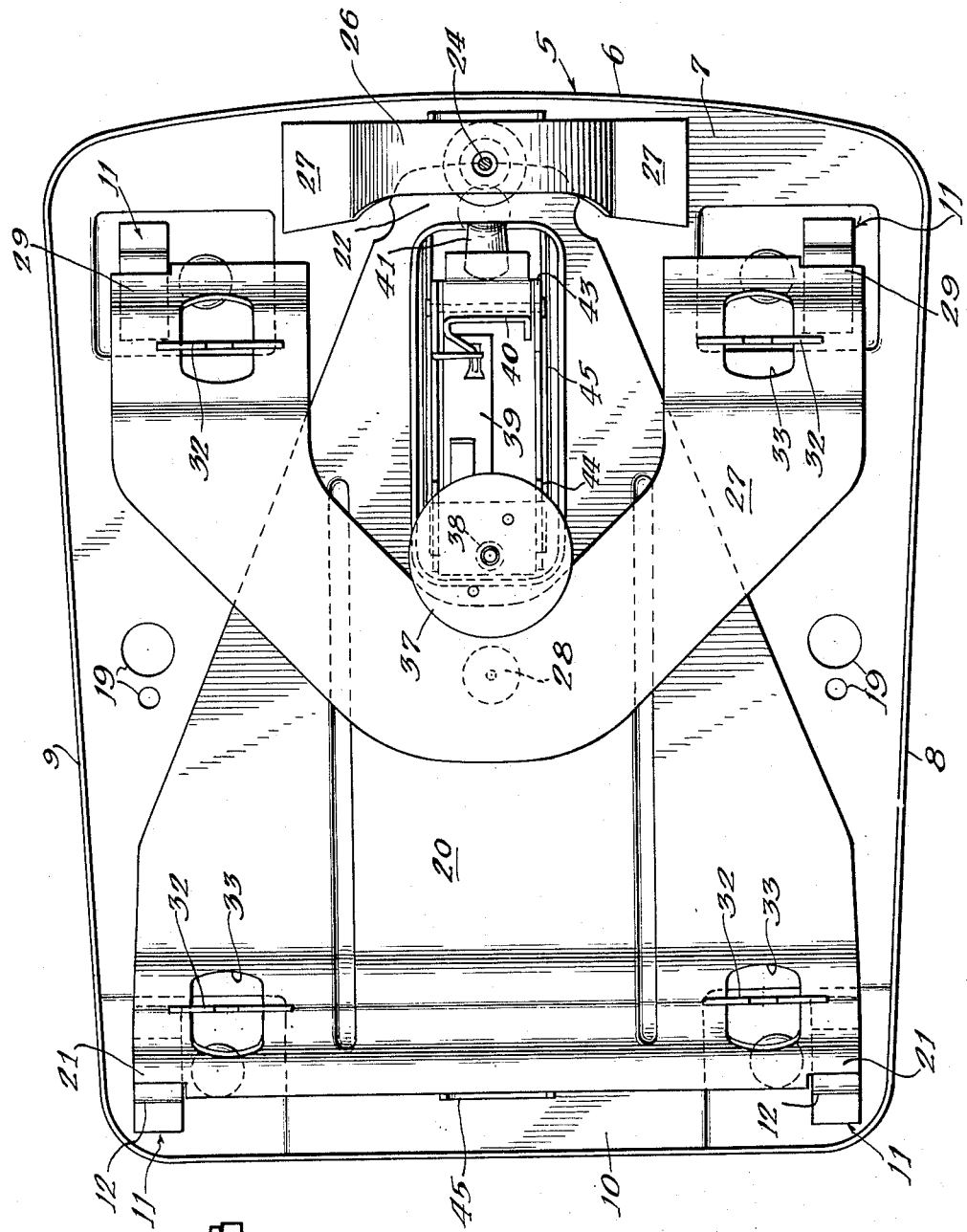

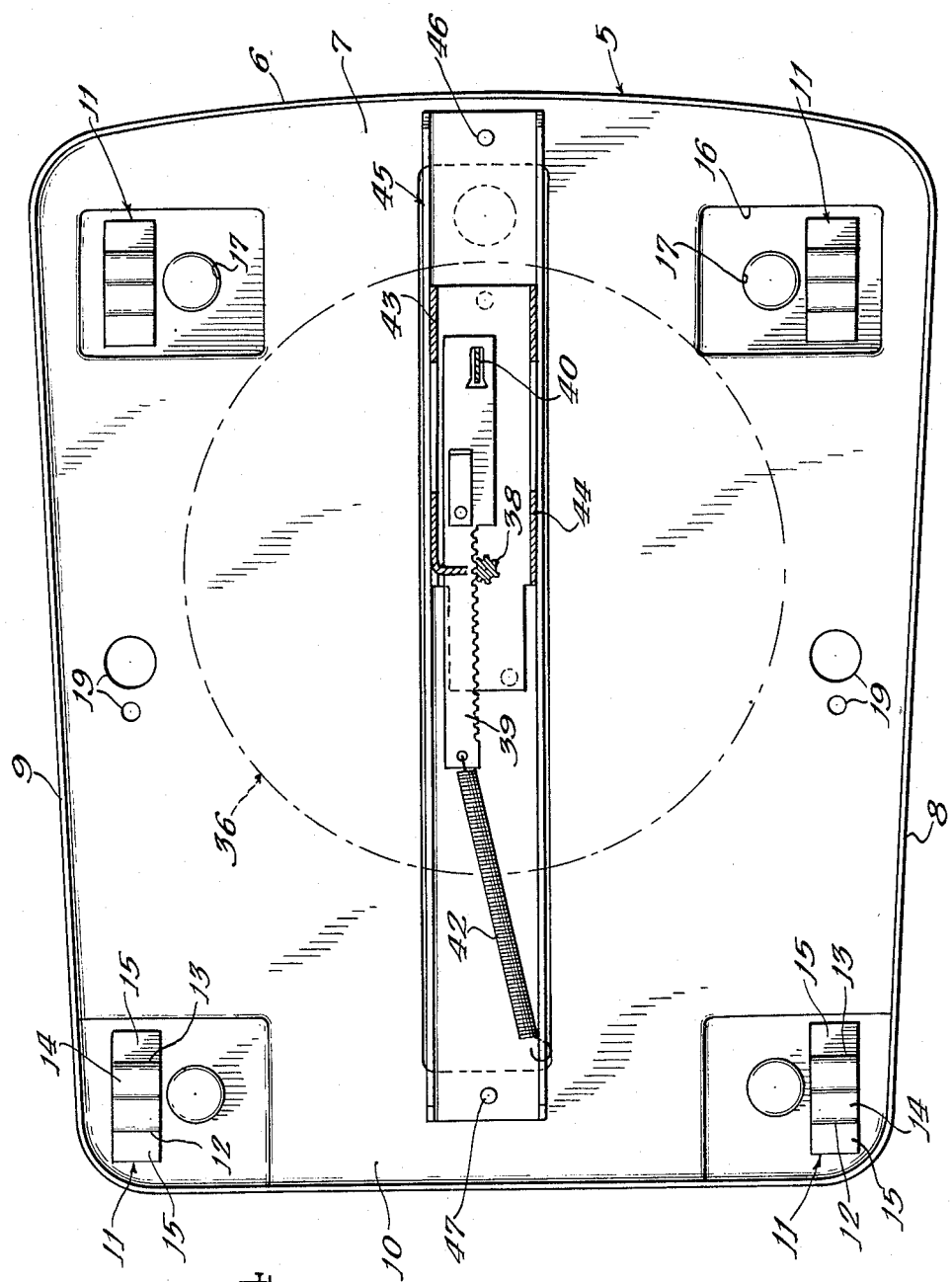

United States Patent Office 2,960,329
Patented Nov. 15, 1960

2,960,329

WEIGHING SCALE

Stan B. Hanssen, Kenilworth, Ill., assignor to Hanson Scale Company, a corporation of Illinois Filed Jan. 22, 1957, Ser. No. 635,379

4 Claims. (Cl. 265—68)

This invention relates to a platform scale of the bathroom type and more particularly to a structure for increasing the accuracy of such scales.

Bathroom scales are generally of metal construction adapted to weigh persons up to 250 pounds. The scale may be formed of stamped or cast metal but in modern day practice is generally made of sheet metal formed in various cutting, stamping and forming operations. The scale itself is generally relatively light weight in comparison with the weight which it is intended to measure. Manufacturers have attempted to decrease the weight of a scale but have found it difficult to do so particularly since any decrease in weight was generally accompanied by increased distortion of the scale parts when a person stepped on the scales. This distortion has affected the accuracy generally as much as 10 pounds. The distorton has been greatest when the scales were placed on an uneven surface or upon a soft floor covering such as a rug or carpeting. The use of such carpeting in bathrooms is becoming more prevalent so that the scale ordinarily used in such rooms is required to rest upon a soft, uneven surface.

It is the principal object of this invention to provide a new and improved scale structure of the character described.

Another object of the invention is to provide a scale structure for eliminating appreciable weighing error due to distortion of the scale parts.

Another object is to provide a structure permitting reduction in the weight of the scale while improving its accuracy.

Another object is to provide a bathroom type scale which may be used with equal accuracy on hard and soft surfaces including rugs and carpeting.

Other objects, features and advantages of the present invention will be apparent from the following description of a preferred embodiment of the invention illustrated in the accompanying drawings; in which;

Figure 1 is a vertical sectional view through approximately the longitudinal section of a bathroom type scale having the invention therein.

Figure 2 is a transverse sectional view through the scale taken substantially along line 2—2 in Figure 1, Figure 3 is a plan view of the scale with the upper platform and dial removed, and Figure 4 is a plan view of the scale with the platform, dial and levers removed.

The general structure of the present scale is preferably the same as has been employed in scales of this type for some time. The base of the scale is provided for supporting a pair of counterbalanced levers in turn carrying an upper platform which forms a decorative cover of the scale structure. A weight indicating mechanism carries a dial which may be viewed through an opening in the cover to indicate the amount of weight placed on the platform. The present invention is concerned with structures for eliminating inaccuracies in the indicating means due to distortion of other scale parts when a person steps upon the platform.

As mentioned above, the scale employs parts which are generally found in modern-day bathroom type scales. The base generally indicated 5 is a stamped sheet metal member formed with an upstanding peripheral edge 6 which extends entirely around the base. The shape of the base may be chosen to make a particular aesthetic appearance for the scale but is generally rectangular. In the present instance, the front end 7 of the base is slightly curved as illustrated in Figures 3 and 4 and the side portions 8 and 9 converge slightly toward the rearward portion 10 of the base. The form is, however, of a generally rectangular configuration.

The sheet metal base is adapted to rest directly upon a floor and support the mechanism of the scale thereon. The support takes the form of upstanding legs 11 generally located in the four corner portions of the base. Each leg has a pair of upright portions 12 and 13 as seen in Figure 1 joined together by V-shaped section 14 for cradling the lever members. The legs 11 may be attached to the base by rivets or spot welding the ears 15 directly to the metal of the base (Figure 4). The legs may be placed in depressed portions 16, stamped into the metal of the base and depressed in a circular portion 17 for forming the floor contacting foot.

The weight sensing mechanism employed consists of a pair of levers arranged in overlapping fashion and resting upon the upstanding feet at the corners of the base. While the levers may vary from those used in the past as to their specific shape, their function is the same as has been present in scales for many years. The longer lever 20 is formed so that its rear edge corner portions 21 form a knife edge to rest into the V-section of the upstanding legs. The forward end 22 of this lever is supported by a calibrated spring 23 attached to it and adjustably extensible by means of a threaded member 24 and thumb nut 25. The thumb nut bears against a cradle or yoke member 26 secured by its ears 27 to the base for the purpose of supporting the spring. The thumb nut is exposed for adjusting and zeroing the scale.

The second lever 27 is positioned above the longer lever and is generally U or V-shaped so that it may rest upon a stamped-in boss 28 formed on lever 20 at about its midpoint, and upon the front pair of upstanding legs 29. The corners of the smaller lever are formed to make a knife edge type of contact with the V-portion of the upstanding legs.

The cooperating levers may pivot on their knife edge supports to sense the amount of weight placed on the platform. The weight is transferred to the levers just inside the knife edge supports. The cover 30 is provided with four (4) depending feet each of which rests in a hanger 32 respectively supported in openings 33 in the levers provided for this purpose. The levers are so bent as to receive the hangers as best illustrated in Figure 2 and have a knife edge support both on the levers and upon the feet secured to the cover. The cover has a depending skirt 34 at its periphery which extends telescopically over the base hiding most of it from view. The entire cover thus is a weight receiving platform. It also carries a lens 35 through which a dial 36 may be viewed. Springs 18 secured to the cover are removably fastened in openings 19 in the base to maintain the cover and base assembled.

The present invention is concerned primarily with the indicating mechanism and particularly with insulating this mechanism from the adverse affects of distortion of the base when a load is placed on the platform. The mechanism itself includes a dial 36 supported upon a disc 37 which is turned by a pinion gear 38 and a rack 39 movable longitudinally upon lowering of the levers. Movement of the rack is accomplished by a bell crank lever 40 engaging a tongue 41 on the larger lever 20, the rack 39 being urged by spring 42 to pull the bell crank in one direction. The bell crank and pinion are supported in a formed member having an upstanding front leg 43 and a similar leg 44 at the rear for providing bearings for the pinion 38. In the past a structure similar to that used in the present invention for indicating the magnitude of weight was supported directly upon the base of the scale. In such position any distortion of the base would move the indicating mechanism relative to the levers and thus cause an erroneous variation in the indicated weight. In the present invention the indicating mechanism is supported entirely out of contact with the intermediate or central portion of the base. This is accomplished by providing a small channel member 45 extending longitudinally of the base centrally between the upstanding legs 11. The entire indicating mechanism is supported in the channel 45. It has been found that the portion of the base between the adjacent feet at the head and foot of the scale was subjected to very little distortion, if any. Advantage was taken of this fact by supporting the channel 45 only at the head and foot of the scale base where very little distortion takes place. Thus, rivets 46 and 47 at the ends of the channel are used to secure it to the base. The portion 48 of the base intermediate the rivets is depressed so as to be out of contact with the channel support even though some distortion might occur. The channel need only be sufficiently stiff to support the weight of the indicating mechanism which in itself is quite light. The entire mechanism is supported on the channel independently of the base even to the extent of fastening the rearward end of the spring 42 to the channel. The only motion transmitted to the mechanism is thus through the detent 41 on the large lever to the bell crank 40.

Various forms of base structures may be used for scales and some structures may have portions of least distortion located in areas other than the areas between the more closely adjacent feet 11. The least amount of error due to distortion will be introduced into the indicating mechanism if it is supported on portions of the base subject to the least distortion. In the present invention it was found that the base metal could be reduced from 16 to 19 gauge, materially decreasing the weight of the scale. Shipping costs are thus reduced materially. Even though the scale may be made of lighter weight metal, the accuracy is greatly increased particularly where the scale is used on an uneven rug or carpeting.

The foregoing detailed description has been given for clearness of understanding only and no unnecessary limitations should be understood therefrom, for some modifications will be obvious to those skilled in the art.

I claim:

1. A platform scale, comprising: a stamped sheet metal base; weight sensing means supported on said base for receiving a weight thereon, said base being distorted by a weight on the sensing means with some base portions receiving less distortion than others; and an indicating mechanism support secured to said less distorted base portions for holding the indicating mechanism responsive to the sensing means with a minimum of inaccuracy due to distortion, said indicating mechanism support comprising an elongated relatively rigid member connected to the sheet metal base near the opposite edges thereof and the base and member being out of contact intermediate the connections.

2. A bathroom scale as specified in claim 1 wherein the rigid member comprises a channel member secured by its web to the base and the sheet metal base is provided with a recess intermediate the ends of the channel member to provide said out-of-contact relation.

3. A platform weighing scale, comprising: a sheet metal base of generally rectangular configuration; counterbalanced levers bearing upon the corner portions of the base and supporting a weight receiving platform, said base being unequally distorted at least in some of its portions by a weight on the platform; an indicating mechanism having a rotatable indicator for visual indication of weight measure and a rack and pinion with an associated bell crank for rotating the indicator in response to movement of the levers; and a support for the indicating mechanism secured to portions of the base subject to no substantial distortion which may rotate the indicator, said base being formed with a central depressed portion extending in the direction of the long dimension of the rectangular base and the support for the indicating mechanism being secured to the base over the depressed portion out of contact therewith.

4. A platform scale, comprising: a stamped sheet metal base; weight sensing means supported on said base for receiving a weight thereon, said sensing means being supported by a pair of spaced feet at the head of the base and another pair of spaced feet at the foot of the base, said base being distorted by a weight on the sensing means with some base portions receiving less distortion than others; and an indicating mechanism support secured to said less distorted base portions for holding the indicating mechanism in position to be responsive to the sensing means, said indicating mechanism support comprising an elongated relatively rigid member connected to the sheet metal base intermediate the feet of each said pair at the head and foot of the base and the rigid member and the base being out of contact intermediate the connections.

References Cited in the file of this patent

UNITED STATES PATENTS

| | | |
|---|---|---|
| 2,105,219 | Kircher | Jan. 11, 1938 |
| 2,130,648 | Mott-Smith | Sept. 20, 1938 |
| 2,232,830 | Sutton | Feb. 21, 1941 |